United States Patent [19]

Gray

[11] 4,338,504
[45] Jul. 6, 1982

[54] ARC PREVENTION AND DETECTION ELECTRICAL DISCHARGE MACHINE SERVO CONTROL SYSTEM

[75] Inventor: Samuel A. Gray, Sun Valley, Calif.

[73] Assignee: Pacific Controls Incorporated, North Hollywood, Calif.

[21] Appl. No.: 70,298

[22] Filed: Aug. 28, 1979

[51] Int. Cl.³ .............................................. B23P 1/02
[52] U.S. Cl. .............................. 219/69 M; 219/69 G; 219/69 C
[58] Field of Search .................. 219/69 G, 69 M, 69 C

[56] References Cited

U.S. PATENT DOCUMENTS

| | | | |
|---|---|---|---|
| 3,435,176 | 3/1969 | Lobur | 219/69 G |
| 3,679,865 | 7/1972 | Jesnitzer et al. | 219/130.01 |
| 3,746,930 | 7/1973 | Van Best et al. | 219/69 G |
| 3,997,753 | 12/1976 | Inoue | 219/69 C |
| 4,009,361 | 2/1977 | Stanton et al. | 219/69 C |

Primary Examiner—C. C. Shaw
Attorney, Agent, or Firm—Nilsson, Robbins, Dalgarn, Berliner, Carson & Wurst

[57] ABSTRACT

A method and apparatus for controlling a servo system for removing an electrical discharge machining system electrode from the vicinity of a workpiece for preventing arcing or short circuit conditions, by sensing radio frequency energy created by the resonance's in the EDM system and generating a withdrawal signal in response to the absence or to a predetermined low level or radio frequency energy, which withdrawal signal causes the electrode to rapidly withdraw, and dampening this withdrawal signal to cause the electrode to slowly return to the working distance from the workpiece.

1 Claim, 2 Drawing Figures

ARC PREVENTION AND DETECTION ELECTRICAL DISCHARGE MACHINE SERVO CONTROL SYSTEM

BACKGROUND OF THE INVENTION

This invention relates generally to a novel method and apparatus for preventing undesirable conditions in electric discharge machining using pulses of electric discharge energy across a gap between an electric discharge machining electrode and a workpiece. More particularly, the invention concerns detecting the absence or low levels of radio frequency energy across the gap during electric discharge machining and causing the electrode to rapidly withdraw from the workpiece in response to the detection of the absence or low levels of the radio frequency energy, which absence or low levels indicates the presence or onset of undesirable damaging conditions in the electric discharge machining.

During electrical discharge machining (EDM) it is desirable to prevent arcing or short circuit conditions. Arcing can occur, e.g., when flushing with the bath of, e.g., oil, between the workpiece and EDM electrode is inadequate or non-existent, when there is an improper distance between the machining electrode and the workpiece or when the EDM pulse cutting current levels are too high. Short circuit conditions can occur due to improper flushing resulting in removed pieces of the workpiece not being flushed and lodging between the workpiece and EDM electrode, causing a short circuit or by the electrode touching the workpiece.

Arcing typically occurs when using Graphite or Copper Graphite EDM electrodes. The arcing is similar to that which occurs in a carbon arc lamp. Many times it is not practical to always maintain perfect flushing conditions due to electrode dimensions or workpiece shape.

Arcing conditions, depending on the severity, can severely damage the workpiece or the electrode, or both. Further, a sustained arcing condition can result in severe damage to the EDM machine and destruction of the shop through fire in the EDM system.

In EDM systems a servo-mechanism is typically used to control the distance between the EDM electrode and the surface of the workpiece being machined in order to optimize the machining conditions. The servo-mechanism for insuring proper sparking between the workpiece and electrode is, in reality, typically a voltage regulator. The average voltage of the EDM machining pulses across the EDM electrode is compared to a reference voltage, and an error signal generated in response to this comparison and used to control the position of the electrode with respect to the workpiece.

In EDM systems currently in use, error signals (UP signals) indicating the electrode is too close to the workpiece typically are on the order of one-third to one-fourth the magnitude or error signals indicating the electrode (DOWN signals) is too far from the workpiece. Thus the servo control mechanism, which is responsive to the polarity and magnitude of the error signal, will cause the electrode to be inserted towards the workpiece at a rate faster than it will cause the electrode to withdraw from the workpiece. This is typically the case when the EDM machine is set for a high efficiency cut.

This condition of higher insertion velocity than withdrawal velocity can cause instability in the EDM system, or cause the electrode to withdraw too slowly or be reinserted too quickly during undesirable short circuit or arcing condition.

Any suitable servo-mechanism can be used, and many are used in the art, to control the gap distance between the electrode and the workpiece in response to the error signal.

Prior art systems attempted to measure voltage across the gap in order to detect abnormal conditions and withdraw the electrode to prevent unwanted arcing and short circuits. However, when arcing or a low resistance path due to unflushed contamination occurs, the average voltage across the gap can be of the same magnitude as when the proper condition of sparking across the gap occurs. Thus the servo-control system would not be signaled to retract the electrode, remaining in that position resulting in arc damage to the electrode or workpiece or both.

The frequency generated by a sparking condition across a gap between an electrode and workpiece has been used in electro-chemical machining (ECM) to detect the existence of undesired sparking during ECM and withdraw the electrode, as shown in the patent to Dehner, U.S. Pat. No. 3,652,440 of Mar. 28, 1972. However, sparking is the desired mode of operation in EDM operations wherein the spark discharges cause the machining of the workpiece to occur.

In EDM systems the electrical energy supplied to the gap to perform the machining is in the form of square wave pulses which can be positive or negative depending on the desired cutting polarity. Typically EDM systems have a pulse repetition rate of from about 1 KHZ to about 250 KHZ, a pulse width of from 3 microseconds to 1 millisecond. Peak machining currents are also typically varied from 0.5 amps to 60 amps, however, power supplies are available to supply up to about 1000 amps. Open circuit voltages with the electrodes removed from the working vicinity of the workpiece can vary typically from 60 to 300 volts.

When the open circuit voltage of the EDM machine is impressed across the gap between the electrode and workpiece with the electrode in the normal desired work position, sufficiently close to allow proper sparking, a wave form of voltage is created across the gap with an initial relatively large spike followed by a voltage at some level above zero. This large spike is caused by the fact that it takes a finite time, on the order of 1 microsecond, to ionize the EDM fluid bath, typically oil, between the electrode and the workpiece.

This wave form is present during all conditions of EDM pulse rate, pulse width, open circuit voltage and peak current so long as the electrode remains the desired distance from the workpiece, resulting in no arcing, and no short circuit exists.

In the past, skilled EDM operators have used the sound of the sparking across the gap as a rough indication of proper sparking across the gap. This has been done by placing the ear of the operator close to the workpiece, or by placing the ear of the operator in sound contact with the workpiece through some sound conducting object, e.g., a wooden dowel placed in contact with the workpiece and the operator's ear.

This can be in some cases dangerous to the operator and is at least an inconvenience to the operator, having to place his ear near the workpiece or against the sound conducting object.

SUMMARY OF A PREFERRED EMBODIMENT OF THE INVENTION

It has been found that the gap voltage wave form during proper cutting causes a phenomenon commonly used in early methods of radio transmission radio spark transmitters. The cables and wires, as well as the mechanical connections, e.g., electrical connectors, terminal strips and the electrode holding mechanism, having finite values of inductance and capacitance, thus creating one or more resonant circuits in the EDM machine. A spectrum analyzer has been used to determine that resonance occur at radio frequencies of up to 30 MHZ and higher when the electrode is properly spaced from the workpiece. The predominant resonant frequency will vary according to the construction of an individual EDM machine.

The present invention makes use of the fact that the ionizing pulse at the onset of each pulse of gap voltage, across the electrode to workpiece gap, shock excites the radio frequency resonant circuits in the EDM machine gap cabling and connections. Thus damped oscillatory radio frequency energy is generated.

The presence, absence or low levels of this radio frequency energy is used to permit proper operation of the EDM machine by detecting abnormal conditions such as low peak levels of ionizing pulses, gap arcs or gap shorts.

A method and apparatus for preventing undesirable conditions in electric discharge machining using pulses of electric discharge energy across a gap between en electric discharge machining electrode and a workpiece according to the presently preferred embodiment of the invention, comprises a method and apparatus for sensing the existence of radio frequency energy across the gap and the generation of a withdrawal signal in response to the absence or low level of this radio frequency energy to cause withdrawal of the electrode from the workpiece in response to this withdrawal signal. The electrode is then caused to be reinserted at a slower rate than it was withdrawn until the desired gap distance is re-established.

The example of the preferred embodiment of the present invention is summarized above rather broadly in order that the detailed description of the preferred embodiment which follows may be better understood, and in order that the contribution to the art may be better appreciated. There are, of course, additional features of the invention that will be described hereafter and which will also form the subject of the appended claims.

DETAILED DESCRIPTION OF A PREFERRED EMBODIMENT OF THE INVENTION

Figure 1:
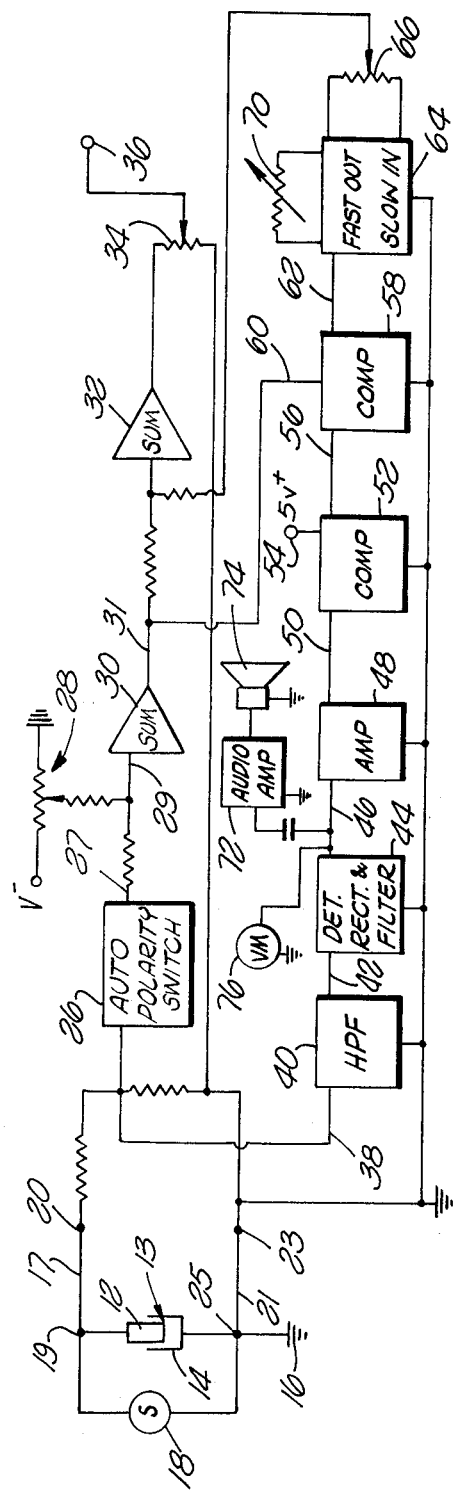
FIG. 1 is a schematic diagram of the circuit of the present invention.

Turning first to FIG. 1, there is shown a schematic diagram of the circuitry of the present invention.

An electric discharge machining (EDM) electrode 12 is positioned across a gap 13 from a workpiece 14 which is grounded at 16.

An electric discharge machining voltage in the form of a series of pulses of preselected power amplitude, pulse width and pulse repetition rate is impressed across the gap 13 by power supply 18.

The EDM unit, including the power supply 18 and the electrode 12, with which the present invention is used can be any of a number on the market, e.g., the "Pulsitron" EP 30 manufactured by Eltec Pulsitron of West Caldwell, N.J.

Power supply 18 is shown in brief schematic to include a suitable power pulse generator. Elements of the power supply 18 which control the pulse amplitude, pulse width and pulse repetition rate of power supply 18 are not shown since they are well known in the art and form no important part of the present invention. Suffice to say that an EDM power supply of any conventional type can be used to supply a series of electric discharge machining pulses to the electrode 12 of a desired pulse power amplitude, pulse repetition rate and pulse width. The voltage pulses cause sparking between the electrode 12 and workpiece 14 across gap 13 which cause the desired machining of the workpiece so long as the voltage pulses are properly controlled, and the electrode 12 remains a proper distance from the workpiece 14 or no short circuit exists between the electrode 12 and workpiece 16.

The electric discharge machining voltage across gap 13 is also placed across an automatic polarity switch, the output pulses of which are representative of the gap voltage pulses in amplitude, pulse rate and pulse repetition rate, but always of a preselected polarity independent of the polarity of the gap voltage pulses.

This is done because the EDM machine will operate with power supply pulses for gap voltage of either positive or negative polarity. However, the voltage regulator type of servo-mechanism control shown in the preferred embodiment of the present invention operates by comparing the average voltage across the gap with a reference voltage 28 which is of a constant polarity.

The output 27 of automatic polarity switch 26 and the reference voltage 28 are added at the input 29 of amplifier 30, the output 31 of which is an average D.C. signal which is fed through amplifier 32 and gain control resistor 34 to the servo-mechanism input 36.

This average D.C. signal output from amplifier 30, under normal operating conditions, is representative of the magnitude of the difference between the average pulse gap voltage and reference voltage 28, and thus the position of the electrode 12, either too close or too far away from workpiece 14. This output at 31, passed through amplifier 32, causes the servo-mechanism (not shown) to position the electrode 12 with respect to workpiece 14 to maintain the absolute average voltage across the gap 13 equal to the preselected value of the reference voltage 28. When the average gap voltage is greater than the setting for the reference voltage 28, the servo receives a control signal at input 36 to move the electrode closer and when the average gap voltage is smaller than the reference voltage the servo receives a signal at input 36 to withdraw the electrode.

The servo system is also highly simplified in the description of the present invention for the purposes of brevity. It will be understood that any of a number of mechanisms well known in the art can be used to insert and withdraw the electrode in response to the magnitude and polarity of the signal at input 36, and that the servo system also includes circuitry to dampen the movement of the servo-mechanism to prevent "hunting" by the servo system in attempting to control the gap distance to maintain average gap voltage equal to the selected value of the reference voltage 28.

What has been described above is well known in the art. This well-known voltage regulator type of servo-mechanism control circuit suffers from the deficiency that under conditions of arcing or gap low resistance due to improper flushing across gap 13, the output 27 of automatic polarity switch 26 appears to be the normal average voltage, which when compared to the reference voltage 28 does not produce a signal at output 31 of amplifier 30 to indicate to the servo-mechanism to withdraw the electrode 12. Thus damaging arcing conditions often are not detected and stopped by withdrawal of the electrode 12.

The present invention, which is a novel improvement on the above-described servo-control system, detects radio frequency signals across the gap and passes them at 38 into a high pass filter 40 which has, e.g., a low cut-off of 2 MHZ.

This high pass filter 40 allows generally all the radio frequency energy, which have been found to be generated across the gap 13 during normal operation of an EDM machine, to pass to detector-rectifier-filter 44 on connecting line 42. As explained earlier, the ionizing pulses shock excite the resonance circuit or circuits formed by the cabling and connections from the power supply 18 to gap 13 and results in the generation of radio frequency energy in the same manner as was used in prior art spark radio transmitters.

Figure 2:
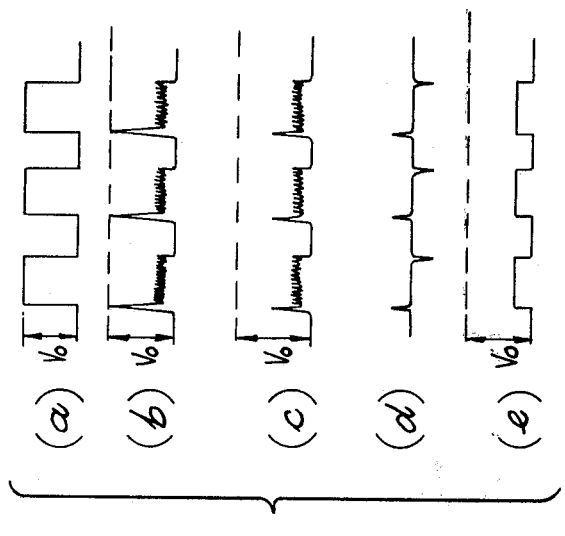
FIG. 2 is a representation of the voltage across the electrode to workpiece gap in various normal and abnormal conditions of operation of an electric discharge machining apparatus.

Turning now to FIG. 2, this can be more fully appreciated. FIG. 2a shows the open circuit voltage supplied to the gap 13 by power supply 18 with the electrode 12 sufficiently removed from the workpiece 14 to prevent sparking across the gap 13. In FIG. 2b is shown the condition where the gap 13 has been reduced by the servo-mechanism inserting the electrode 12 toward workpiece 14 sufficiently to allow sparking. A large initial voltage spike shown at the outset of each pulse in FIG. 2b is caused by the initial ionization of the electric discharge machining fluid present in gap 13. This pulse is of generally the same amplitude, Vo, as the open circuit voltage shown in FIG. 2a and is followed by a voltage level of about 15 to 20 volts across gap 13.

It has been found that the initial ionizing voltage spike shown in FIG. 2b causes the circuitry connecting power supply 18 to gap 13 to oscillate at radio frequencies which can be detected across gap 13. The amplitude of these detectable radio frequencies is a function of the amplitude of the ionizing pulses. The amplitude of the detected radio frequencies is also relatively constant with cutting power level changes, assuming a constant ionizing pulse amplitude. As the cutting power level increases, the source impedance of power supply 18 is lowered thus lowering the "Q" value of the gap resonance circuits. This tends to maintain a relatively constant value of radio frequency energy during gap ionizing periods over a wide range of cutting power levels. In addition the cables used to connect the circuitry of the present invention to the EOM, i.e., across the gap as shown schematically in FIG. 1 as the connecting lines 17, between junction 19 and junction 20, and 21 between junction 23 and junction 25, are coaxial cables which tend to amplify the radio frequency energy by themselves resonating at some frequency, depending on their length and size. Thus they contribute to the operation of the present invention.

Turning again to FIG. 1, this radio frequency energy on lead line 42 is rectified and further filtered in detector-rectifier-filter 44 such that, for all frequencies of radio signals passed by the high pass filter 40 and at typical operating parameters of open circuit voltage pulse width and pulse repetition rate from the power supply 18, a D.C. voltage of between about 1 and 1.5 volts is present on the output 46 of detector-rectifier-filter 44 and passes to D.C. amplifier 48. This output is representative of the presence of radio frequency energy across the gap 13. D.C. amplifier 48 is set to produce an output at 50, under the above-described input conditions, of about 8 to 10 volts D.C.

The signal on connecting line 50 is then the input to comparator 52 which has a 5 volt positive bias 54. Thus, when radio frequency energy below one-half of the normal level is detected across the gap 13, the output of amplifier 50 will drop below the 5 volts positive bias of comparator 52 causing an output signal from comparator 52 at 56 which passes through comparator 58, as will be more fully described below, and energizes a fast-out slow-in circuit 64. An output is then generated from fast-out slow-in circuit 64 which passes through gain control resistor 66 to amplifier 32 to cause the electrode 12 to be withdrawn rapidly as will more fully be described below.

Returning to FIG. 2a, it can be seen that when open circuit voltage Vo is present across the gap 13 there is no ionizing voltage spike to excite the resonant circuits in the EDM power cabling and mechanism. Thus, before electrode 12 can be moved by the servo-mechanism sufficiently close to cause the onset of the desired electric discharge machining sparking, comparator 52 will have an output at 56 which would cause the servo-mechanism to withdraw the electrode 12. This must be overriden in order to allow the electrode 12 to close the gap 13 sufficiently so that sparking can initiate.

This is done by using the output of amplifier 30 at 31 to bias a second comparator 58 through connecting line 60. The output of amplifier 30 is sufficiently high when open circuit voltage Vo exists across the gap 13 to prevent the second comparator 58 from being energized by the signal from the first comparator 52 at 56, indicating an absence of radio frequency energy across the gap 13.

Thus the fast-out slow-in circuit 64 is not energized and the servo-control mechanism is not prevented from inserting the electrode 12 sufficiently to cause sparking to initiate across gap 13 which will lead to the initiation of the voltage wave form shown in FIG. 2a across the gap and generate radio frequency energy. This will then remove the output signal at 56 from the first comparator 52.

As open circuit voltage is removed from the gap and normal average sparking gap voltages are present, the output of amplifier 30 will drop to less than about 0.5 volts. Thus when the comparator 52 senses a loss of radio frequency energy across the gap 13 its output signal at 56 of about 1.4 volts will exceed the bias on line 60 and cause comparator 58 to turn on thus energizing the fast-out slow-in circuit 64.

As was described above, the output of amplifier 30 is a positive or negative value depending on whether the gap voltage or the selected value of the reference voltage is larger and is used to control the servo-mechanism to insert or withdraw the electrode 12 in response to the magnitude and polarity of the output of amplifier 30.

In order to insure that the electrode 12 will be withdrawn and withdrawn relatively rapidly, even when the output of amplifier 30 is of a polarity which would cause the servo-mechanism to insert the electrode 12, the fast-out slow-in circuit 64, once energized, places on the input of amplifier 32, through a connecting line 68 and a gain control resistor 66, a large signal of a polarity which would cause the servo-mechanism to rapidly withdraw the electrode 12. This signal is desirably about equal to the amplitude of the greatest possible output of amplifier 30 calling for insertion of the electrode 12, i.e., with open circuit voltage across the gap. Thus the output of fast-out slow-in circuit 64 is set through gain control register 66 to have a magnitude equal to and a polarity opposite from the maximum electrode-insert signal which could exist at the output of amplifier 30.

In this way, even if an electrode-insert signal exists on the output of amplifier 30, based upon the comparison of gap voltage to the selected value of reference voltage 28, the output of amplifier 32, which is representative in amplitude and polarity to the difference between the output of amplifier 30 and the signal on line 68, will be a signal causing the servo-mechanism to withdraw the electrode 12 at a relatively rapid rate.

As the electrode 12 is withdrawn, either open circuit voltage will be achieved across the gap, causing comparator 58 to be biased off or the undesirable condition represented by the loss of radio frequency energy across the gap will be removed and comparator 52 will again turn off when the output signal of amplifier 48 at 50 increases above the bias of comparator 52 in response to radio frequency energy existing across the gap 13.

When this occurs, it is desirable to slowly cause the electrode to be reinserted into the workpiece to reduce the gap 13 sufficiently to reinstate the desired sparking. Otherwise, the servo-mechanism would likely be caused to excessively hunt for the ideal electrode position which will eliminate the undesired condition and at the same time allow sparking across the gap.

This is conveniently accomplished by dampening resistor 70. Damping resistor 70 causes the output of fast-out slow-in circuit 64 to be slowly dampened once the output of comparator 58 is such as to de-energize the fast-out slow-in circuit. Thus the voltage on line 68 will slowly decrease along the exponential curve having any suitable preselectable time constant due to the variability of dampening resistor 70, such that eventually the output of amplifier 30 which would be an electrode-in signal of some amplitude, would exceed the amplitude of the signal on line 68. After this point the input 36 to the servo-mechanism would receive a slowly increasing electrode-in signal as the signal on line 68 continues to decrease and until the electrode is moved in sufficiently to cause sparking to initiate and thus remove the output signal from the amplifier 30.

Turning once again to FIG. 2, it will more fully be understood how the present invention prevents the onset or continuation of undesired conditions in an EDM machine, e.g., arcing and short circuits.

When arcing occurs across the gap 13, the wave form of the voltage across the gap from electrode 12 to workpiece 14 appears to be much the same, in shape but not necessarily amplitude, as open circuit voltage as shown in FIG. 2e except that the amplitude is lower than open circuit voltage Vo and is typically on the order of a proper cutting level. Further, if the gap voltage under such conditions is not equal to normal cutting voltage the servo system controlling the electrode 12's position will move the electrode 12 to achieve such equality, causing continued generation of the damaging arc. Thus the servo-mechanism will not receive an electrode-out signal from amplifier 30 to cease the arcing.

When the electrode 12 is arcing to the workpiece 14, either directly or through unflushed foreign matter in the gap between the electrode 12 and workpiece 14, a pure resistance exists across the gap 13.

FIG. 2c shows the gap voltage when the electrode 12 is too close to workpiece 14. This is not a damaging condition, but is indicative of the possible imminent onset of arcing. The present invention is also responsive to this condition to prevent the onset of arcing.

It will be noticed in FIG. 2e that the initial ionizing spikes, which have been found to generate radio frequency energy in the EDM system by resonance is not present. Small spikes do occur in the conditions represented by FIGS. 2c and 2d, but they are not of sufficient amplitude to generate an adequate level of radio frequency energy.

In the absence of comparator 52 signal, except when the electrode 12 is not sufficiently close to the workpiece 14 to allow sparking, i.e., when open circuit voltage is across the gap 13, the circuit above described will cause an output on line 68 to drive amplifier 32 in response to this output on line 68, which in turn will create a signal at the input 36 to the servo-mechanism resulting in a relatively rapid withdrawal of the electrode 12.

A further feature of the present invention resides in providing the operator with an audio and/or visual presentation of the gap ionizing voltage initiated radio frequency energy during operation of the EDM machine.

An audio amplifier 72, a speaker 74 and/or a dampened voltmeter 76 can conveniently be connected to the output 46 of the detector-rectifier-filter 44, allowing the operator to listen to or see the radio frequency energy level as an indication of proper operation and to avoid the necessity for listening to sparking noises.

The foregoing description of the invention has been directed to a particular preferred embodiment in accordance with the requirements of the Patent Statutes and for purposes of explanation and illustration. It will be apparent, however, to those skilled in this art that many modifications and changes in both apparatus and method may be made without departing from the scope and spirit of the invention.

For example, individual EDM systems could be tested by Spectrum Analyzers to determine the dominant resonant frequencies during normal operation and a band pass filter used to make the present invention sensitive to a preselected narrower range of radio frequencies. Further, many other circuit modifications will be apparent to those skilled in the art of EDM control using some mechanism to insert and withdraw the electrode, which will not depart from the fundamental consept of the present invention of using the absence of radio frequency energy existing across the gap 13 when undesirable conditions are present or the onset of such undesirable conditions is imminent to control the electrode position, momentarily cutting off machining current or decreasing the duty cycle of machining pulses to remove those undesirable conditions rapidly, thus preventing damage to the EDM machine, workpiece or electrode.

It will be further understood by those skilled in the art that the present invention may also be utilized, with suitable modifications known in the art. For example, the output of the fast-out slow-in circuit could be converted from its analogue value to a digital value and used in any of the many digital control systems presently on the market as a signal indicative of undesirable conditions and for controlling the withdrawal of the electrode 12, momentarily cutting off machining current, or decreasing the duty cycle of machining pulses.

These and other modifications of the invention will be apparent to those skilled in this art. It is the applicant's intention in the following claims to cover all such equivalent modifications and variations as fall within the true spirit and scope of the invention.

I claim:

1. A method of preventing undesirable conditions in electric discharge energy across a gap between an electric discharge machining electrode and a workpiece, comprising the steps of:

detecting the voltage across the gap and generating a first voltage signal representative of said voltage;

generating a second voltage signal representative of a preselected desired voltage across the gap;

comparing said first voltage signal to said second voltage signal and generating a servo control signal responsive to the difference between said first and second voltage signals, said servo control signal being applied to a servo control mechanism for withdrawing the electrode when said difference is of one polarity;

sensing radio frequency energy within a preselected range of frequencies across the gap and generating a withdrawal signal in response to said radio frequency energy being below a preselected level, and adding said withdrawal signal to said servo control signal, said withdrawal signal being of said one polarity and of sufficient magnitude to cause said mechanism to rapidly withdraw the electrode, even though said servo control signal of said opposite polarity is present, the rate of speed of withdrawal responsive to said withdrawal signal being greater than the rate of speed of withdrawal of the electrode when the radio frequency energy is above said preselected level, and in the absence of said withdrawal signal immediately reinserting the electrode, at a rate slower than the electrode was withdrawn, in order to reestablish a desired gap distance.

* * * * *